United States Patent
Okabe

(10) Patent No.: US 9,742,953 B2
(45) Date of Patent: Aug. 22, 2017

(54) DOCUMENT MANAGEMENT SYSTEM, DOCUMENT MANAGEMENT METHOD, AN IMAGE FORMING APPARATUS, AN ANALYSIS SERVER AND STORAGE MEDIUM

(71) Applicant: CANON KABUSHIKI KAISHA, Tokyo (JP)

(72) Inventor: Kouya Okabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/099,961

(22) Filed: Apr. 15, 2016

(65) Prior Publication Data
US 2016/0321018 A1 Nov. 3, 2016

(30) Foreign Application Priority Data
May 1, 2015 (JP) .................................. 2015-094348

(51) Int. Cl.
*H04N 1/04* (2006.01)
*H04N 1/10* (2006.01)
*H04N 1/00* (2006.01)

(52) U.S. Cl.
CPC ............. *H04N 1/10* (2013.01); *H04N 1/0097* (2013.01); *H04N 1/00944* (2013.01)

(58) Field of Classification Search
CPC ........... H04N 1/00411; H04N 1/00413; H04N 1/00432; H04N 1/00435; H04N 1/00474; H04N 1/00482; H04N 1/00514; H04N 1/32561; H04N 1/4413; H04N 1/00973; H04N 1/00347; H04N 1/00938; H04N 2201/0094

USPC ...... 358/1.13, 1.15, 1.9, 452, 453, 462, 537, 358/538; 709/223

See application file for complete search history.

(56) References Cited

U.S. PATENT DOCUMENTS

| 7,778,969 | B2 * | 8/2010 | Oi ....................... G06F 17/2247 707/613 |
| 8,051,379 | B2 * | 11/2011 | Iwata ..................... G06K 15/00 715/744 |
| 8,495,191 | B2 * | 7/2013 | Numata ................. G06Q 10/06 358/403 |
| 8,621,110 | B2 * | 12/2013 | Okabe .................... G06F 15/16 358/1.15 |
| 9,503,602 | B2 * | 11/2016 | Furushige .......... H04N 1/00938 |

(Continued)

FOREIGN PATENT DOCUMENTS

JP 2001-101213 A 4/2001

*Primary Examiner* — Negussie Worku
(74) *Attorney, Agent, or Firm* — Fitzpatrick, Cella, Harper & Scinto

(57) ABSTRACT

An image forming apparatus of the present embodiment notifies an analysis server of the start and end of a continuous scan scanning a plurality of documents relating to one another. The analysis server collectively analyzes the plurality of pieces of scanned data received between the start of the continuous scan and the end of the continuous scan in response to notification of the end of the continuous scan and transmits one or more storage destination candidates that are output as the results of the analysis to the image forming apparatus. The image forming apparatus outputs the plurality of pieces of scanned data to a storage destination determined from among the one or more storage destination candidates.

13 Claims, 14 Drawing Sheets

(56) References Cited

U.S. PATENT DOCUMENTS

| | | | |
|---|---|---|---|
| 2005/0021950 A1* | 1/2005 | Rothbarth | G06F 11/1464 713/165 |
| 2008/0215667 A1* | 9/2008 | Rothbarth | G06F 11/1464 709/202 |
| 2009/0282117 A1* | 11/2009 | Numata | G06Q 10/06 709/206 |
| 2010/0245897 A1* | 9/2010 | Ando | H04N 1/0097 358/1.15 |

* cited by examiner

| Document ID | Group ID |
|---|---|
| D01084 | A00325 |
| D01085 | A00325 |
| D01086 | A00325 |
| ... | |

| Document ID | Storage destination candidate |
|---|---|
| D01084 | /aaa/bbb/ccc/ |
| D01084 | /aaa/ggg/hhh/iii/ |
| D01085 | /xxx/yyy/zzz/ |
| D01085 | /aaa/bbb/ddd/ |
| D01086 | /aaa/mmm/lll/ |
| D01086 | /aaa/mmm/nnn/ |
| ... | |

| Document ID | Storage destination candidate |
|---|---|
| D01084 | /aaa/bbb/ccc/ |
| D01084 | /aaa/ggg/hhh/iii/ |
| D01085 | /xxx/yyy/zzz/ |
| D01085 | /aaa/bbb/ddd/ |
| D01086 | /aaa/mmm/lll/ |
| D01086 | /aaa/mmm/nnn/ |
| ALL | /xxx/yyy/zzz/ |
| ALL | /aaa/bbb/ddd/ |
| ALL | /ppp/qqq/ |
| ... | |

1231

DOCUMENT MANAGEMENT SYSTEM, DOCUMENT MANAGEMENT METHOD, AN IMAGE FORMING APPARATUS, AN ANALYSIS SERVER AND STORAGE MEDIUM

BACKGROUND OF THE INVENTION

Field of the Invention

The present invention relates to a document management system in which an image forming apparatus and an analysis server are connected via a network, a document management method, and a storage medium storing programs for implementing the document management system and the document management method.

Description of the Related Art

In recent years, in businesses that handle a large number of paper documents, such as a law business, a document management system is known, in which paper documents are electronized by making use of an image forming apparatus equipped with a push scan function and scanned data is classified into a related storage destination.

In such a document management system, classification of scanned data is performed by various methods. For example, in the case where classification of scanned data is performed based on the operation of a user, the scanned data and the storage destination are associated with each other by a user specifying the storage destination, referring to the storage destination history in the past, or referring to a book mark registered in advance.

Further, in the case where classification of scanned data is performed based on automatic processing of an image forming apparatus, for example, the method that has been disclosed in Japanese Patent Laid-Open No. 2001-101213 is known. Japanese Patent Laid-Open No. 2001-101213 has disclosed the method in which the image forming apparatus transmits scanned data to the document management server, and the document management server analyzes the contents of the scanned data and classifies the scanned data into an appropriate storage destination based on the analysis results.

FIG. 1A is an outline diagram showing an aspect in which the image forming apparatus described in Japanese Patent Laid-Open No. 2001-101213 classifies the scanned data of the documents A to C into the appropriate storage destinations, respectively. The image forming apparatus refers to the analysis results of each piece of the scanned data received from the document management server, the category information on each folder, etc., and classifies the scanned data of the documents A to C into the folders A to C, respectively.

SUMMARY OF THE INVENTION

As described above, the image forming apparatus described in Japanese Patent Laid-Open No. 2001-101213 refers to the analysis results of each piece of the scanned data received from the document management server, the category information on each folder, etc., and classifies the scanned data into a storage destination suitable to each piece of the scanned data.

However, there is a desire to collectively handle a group of documents, such as those which are used for the same project, as documents relating to one another. The image forming apparatus described in Japanese Patent Laid-Open No. 2001-101213 handles each piece of the scanned data individually, and therefore, it is not possible to collectively classify each piece of the scanned data of the documents A to C into an appropriate storage destination even in the case where it is desired to handle the documents A to C as a group of documents β in which each document relates to one another (FIG. 1B).

The present invention has been made in view of the above-described problem and an object of the present invention is to provide a document management system capable of collectively classifying scanned data generated by scanning a plurality of documents relating to one another into an optimum storage destination, a document management method, and a storage medium storing programs for implementing the document management system and the document management method.

The document management system according to the present invention is a document management system in which an image forming apparatus that transmits scanned data generated by scanning a document to an analysis server and which outputs the scanned data to a storage destination determined from among one or more storage destination candidates corresponding to the scanned data received from the analysis server, and the analysis server that analyzes the scanned data received from the image forming apparatus and which transmits the one or more storage destination candidates that are output as the results of the analysis to the image forming apparatus are connected via a network, and the image forming apparatus includes a notification unit configured to notify the analysis server of the start and end of a continuous scan scanning a plurality of documents relating to one another, a reception unit configured to receive first storage destination candidates corresponding to a plurality of pieces of scanned data in response to transmission of the plurality of pieces of scanned data generated between the start of the continuous scan and the end of the continuous scan to the analysis server, a determination unit configured to determine the storage destination of the plurality of pieces of scanned data from among the first storage destination candidates, and an output unit configured to output the plurality of pieces of scanned data to the determined storage destination, and the analysis server includes a first analysis unit configured to collectively analyze the plurality of pieces of scanned data received between the start of the continuous scan and the end of the continuous scan in response to notification of the end of the continuous scan from the notification unit, and a transmission unit configured to transmit the first storage destination candidates that are output as the results of the analysis to the image forming apparatus.

Further features of the present invention will become apparent from the following description of exemplary embodiments (with reference to the attached drawings).

BRIEF DESCRIPTION OF THE DRAWINGS

FIG. 12A is a diagram showing an example of a group ID table in the embodiment;

FIG. 12B and FIG. 12C are diagrams each showing an example of a storage destination candidate table in the embodiment;

DESCRIPTION OF THE EMBODIMENTS

Hereinafter, embodiments for embodying the present invention are explained with reference to the drawings. Components described in the embodiments are merely exemplary and are not intended to limit the scope of the present invention to those components.

Figure 1B:
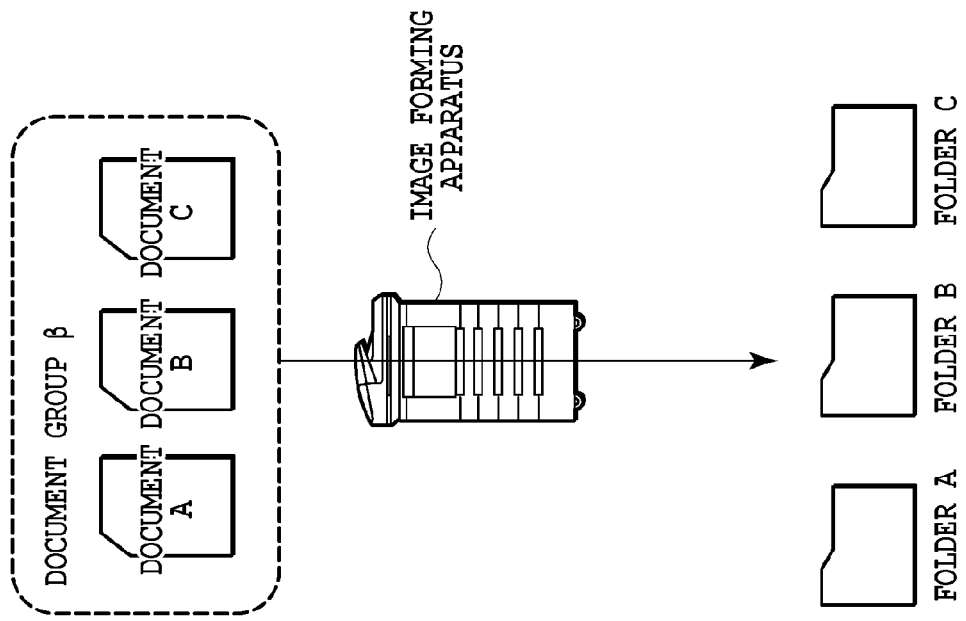
FIG. 1B is an outline diagram showing an aspect in which an image processing apparatus collectively classifies scanned data relating to one another into an appropriate storage destination.
Figure 1A:
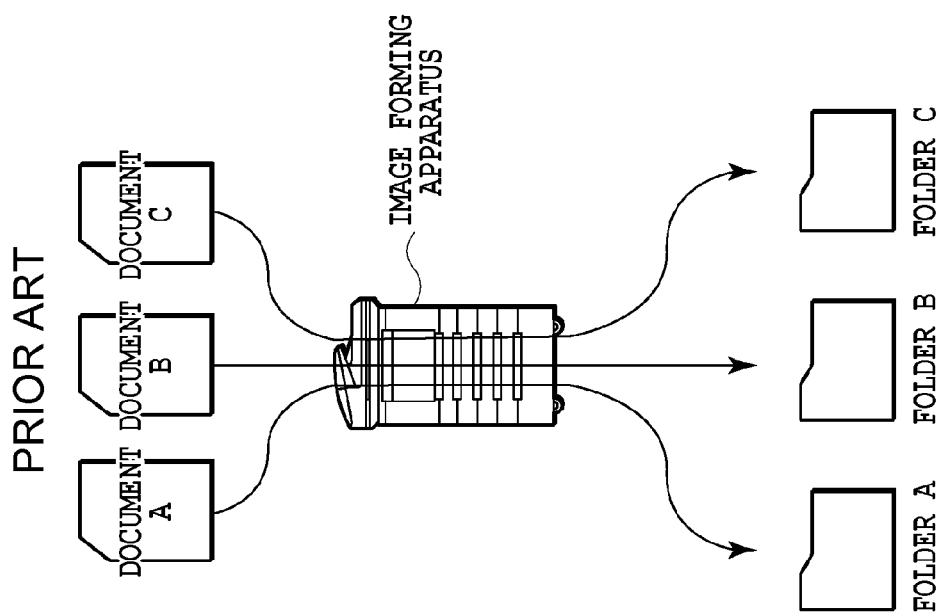
FIG. 1A is an outline diagram showing an aspect in which an image forming apparatus of the prior art classifies scanned data into an optimum storage destination.
Figure 2:
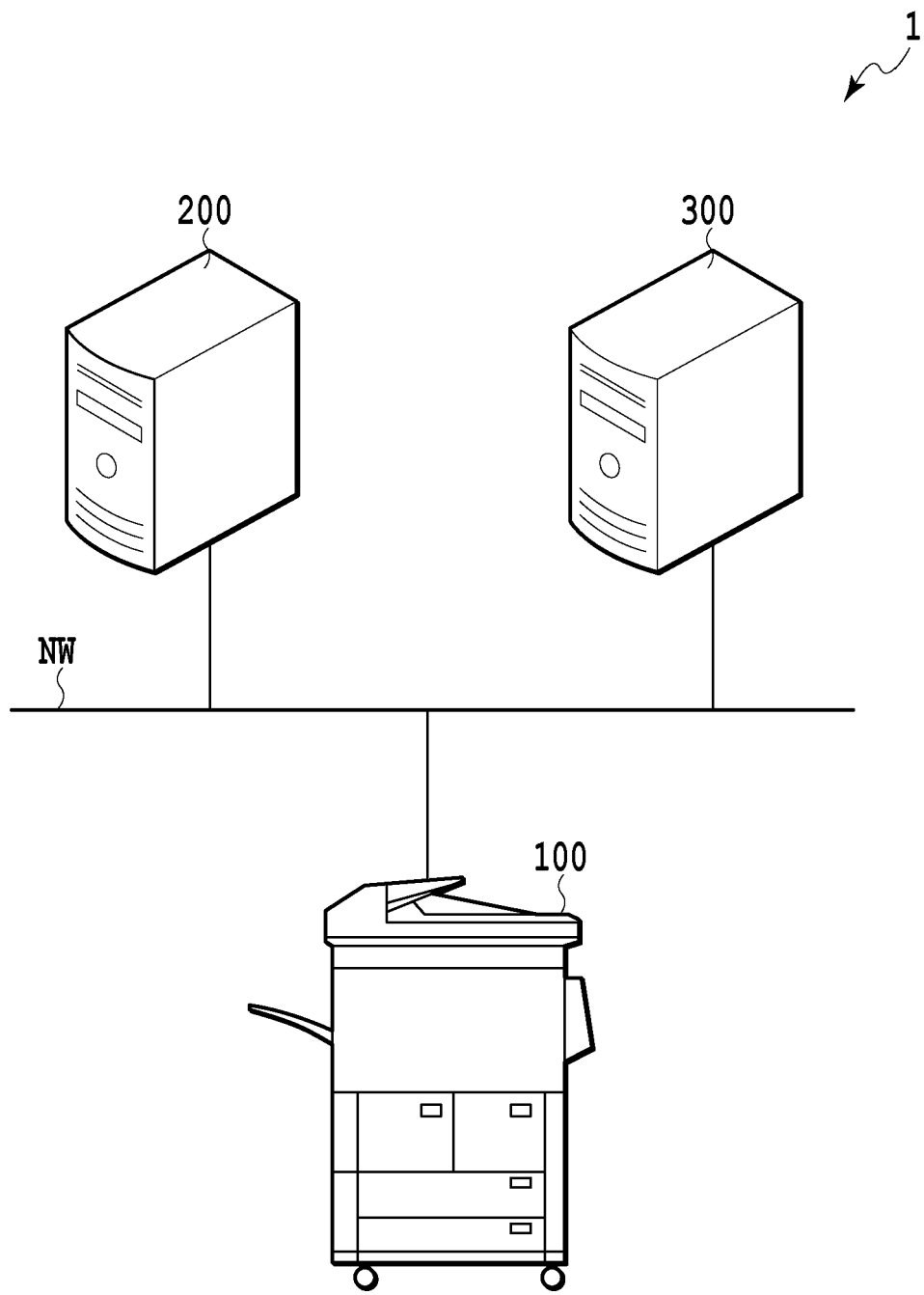
FIG. 2 is a diagram showing an entire configuration of a document management system in an embodiment.

FIG. 2 is a diagram showing an entire configuration of a document management system 1 in the present embodiment. The document management system 1 includes an image forming apparatus 100, an analysis server 200, and a file server 300, which are connected so as to be capable of communicating with one another via a network NW. The network NW is the infrastructure for establishing communication between each information processing device and may be an intranet, Internet, or another kind of network.

The image forming apparatus 100 is implemented by, for example, an MFP (Multi Function Peripheral). The image forming apparatus 100 may be connected to a LAN (Local Area Network) and managed by a local IP address. In the case where the image forming apparatus 100 is managed by a local IP address, a gateway (not shown), such as a router, exists between the image forming apparatus 100 and the network NW and address conversion is performed by the gateway. In the case where the analysis server 200 or the file server 300 is connected to a LAN different from that to which the image forming apparatus 100 is connected, the image forming apparatus 100 communicates with the analysis server 200 and the file server 300 via the gateway and the network NW.

The analysis server 200 in the present embodiment has a crawl function. By means of the crawl function, the analysis server 200 automatically collects an electronized file stored in the file server 300 or the like and extracts part of or all the contents from the collected file. Further, the analysis server 200 stores the extracted contents of the file and information on the storage destination of the file, such as a folder path, in a file information database (hereinafter, database is described as "DB") 205 in association with each other. Furthermore, the analysis server 200 has a function to output a storage destination candidate list of scanned data received from the image forming apparatus 100. The analysis server 200 extracts contents from the scanned data and acquires information on the storage destination in which a file having contents similar to the extracted contents is stored from the file information DB 205. Next, the analysis server 200 outputs a storage destination candidate list in which the scanned data and the storage destination information are associated with each other. In the present embodiment, contents may include various kinds of text, images, etc.

The file server 300 in the present embodiment is connected with the image forming apparatus 100 and the analysis server 200 via the network NW, and the image forming apparatus 100 receives scanned data and manages the scanned data as an electronized file. For the file server 300 shown in FIG. 2, an example of a configuration including the one file server 300 is shown, but a configuration including a plurality of file servers 300 connected via the network NW may be accepted.

Figure 3:
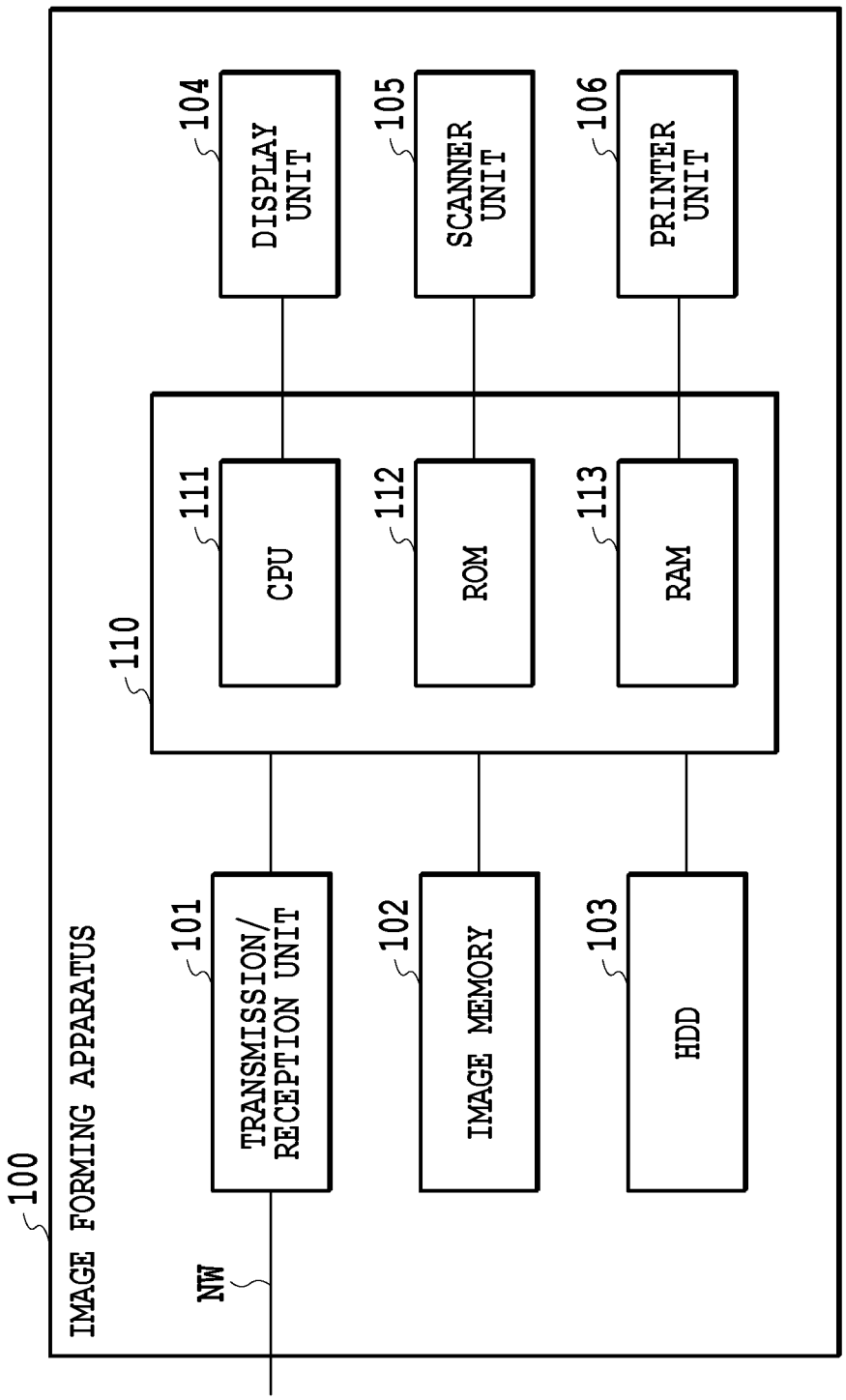
FIG. 3 is a block diagram showing a hardware configuration of an image forming apparatus in the embodiment.

FIG. 3 is a block diagram showing a hardware configuration of the image forming apparatus 100 in the present embodiment. In the block diagram shown in FIG. 3, the control unit 110 includes a CPU 111, a ROM 112, and a RAM 113 and controls the entire operation of the image forming apparatus 100. The CPU 111 reads control programs stored in the ROM 112 onto the RAM 113 and performs various kinds of control processing. The RAM 113 is used as a temporary storage area of the CPU 111. Further, the control unit 110 controls each operation that is performed by a display unit 104, a scanner unit 105, a printer unit 106, and a transmission/reception unit 101. The display unit 104 is implemented by, for example, a touch screen display and displays an operation screen or the like receiving an input of instructions to the image forming apparatus 100. The scanner unit 105 generates scanned data by scanning a document, which is a paper document, and saves the generated scanned data in an HDD 103 as well as outputting the generated scanned data to the control unit 110. The scanner unit 105 includes an ADF (Auto Document Feeder) and upon receipt of the input of instructions to place and scan a plurality of documents on the ADF, generates scanned data by automatically scanning the documents one by one. The function of the scanner unit 105 such as this is called a so-called push scan function. The printer unit 106 prints the scanned data that is output from the control unit 110 on a printing medium, such as a printing sheet. The transmission/reception unit 101 connects the control unit 110 to the network NW and receives print data and various kinds of data, such as screen display data that is displayed on the display unit 104 from various information processing devices (not shown) outside the image forming apparatus 100. Further, the transmission/reception unit 101 transmits the scanned data generated in the scanner unit 105 to a specified transmission destination. The HDD 103 stores scanned data, control programs, etc. Various control programs in the present embodiment are also stored in the HDD 103. The print data received from the information processing device outside the image forming apparatus 100 is temporarily saved in an image memory 102 and is printed by the printer unit 106 via the control unit 110.

Figure 4:
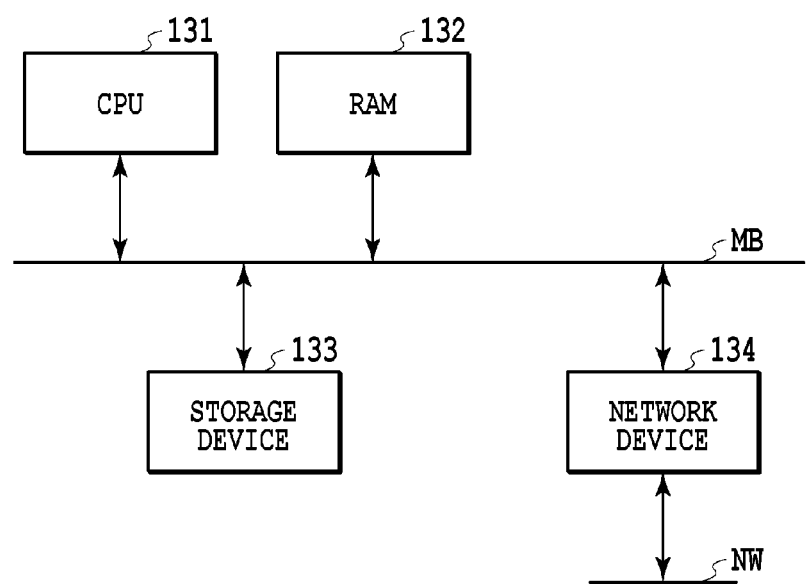
FIG. 4 is a block diagram showing a hardware configuration of a computer device in the embodiment.

FIG. 4 is a block diagram showing a hardware configuration of a computer device in the present embodiment and the computer device implements the analysis server 200 and the file server 300. In the computer device, a CPU 131 that controls the computer device, a RAM 132 that provides a temporary storage area of the CPU 131, and a storage device 133 that stores various control programs running on the computer device are connected to one another via a main bus MB. The communication between the main bus MB and various information processing devices (not shown) outside the computer device is performed via a network device 134 and the network NW. In the present embodiment, the CPU 131 controls the RAM 132, the storage device 133, and the network device 134 via the main bus MB.

Figure 5:
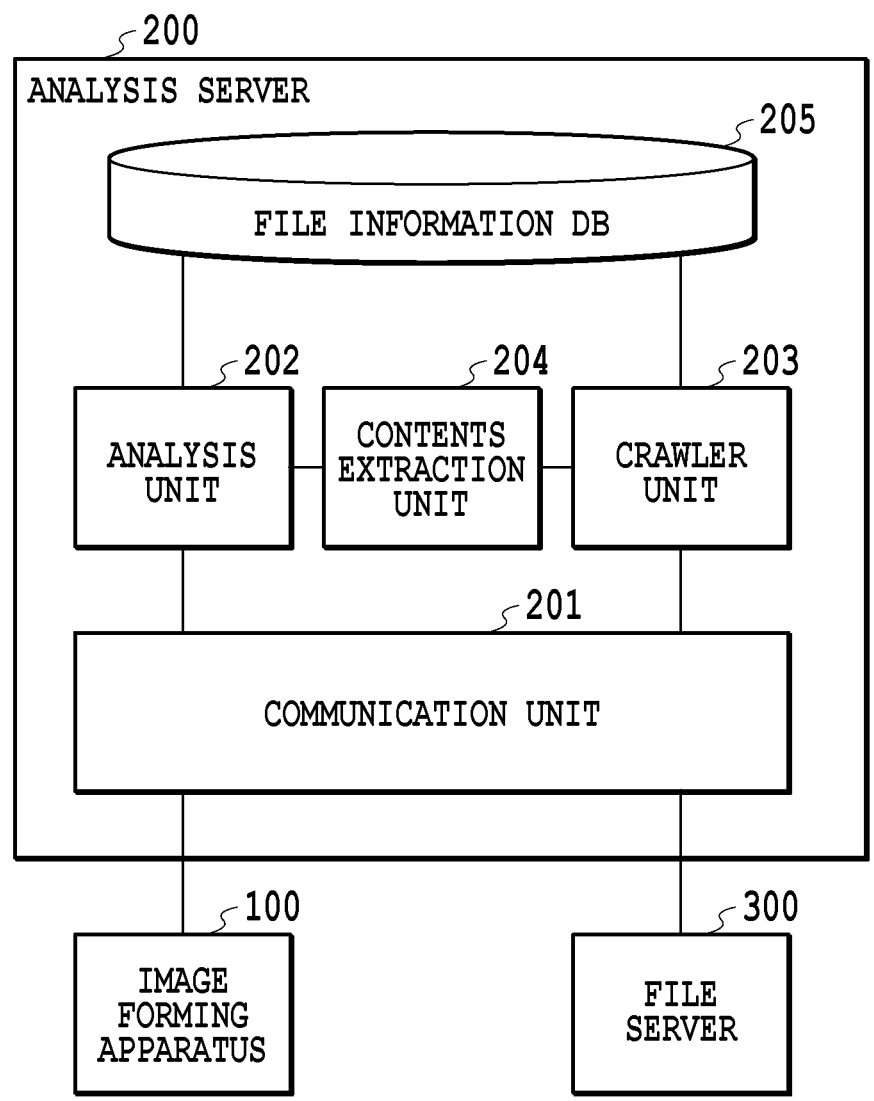
FIG. 5 is a block diagram showing a software function configuration of an analysis server in the embodiment.

FIG. 5 is a block diagram showing a software function configuration of the analysis server 200 in the present embodiment. The processing in each function unit shown in FIG. 5 is performed by the CPU 131 executing the program code stored in the storage device 133 after developing the program code onto the RAM 132. The analysis server 200 has a communication unit 201, an analysis unit 202, a crawler unit 203, a contents extraction unit 204, and the file information DB 205.

The crawler unit 203 collects, via the communication unit 201, a file stored in the file server 300 or the like and storage destination information specifying the location where the file is stored. The crawler unit 203 does not collect a file that is already stored in the file information DB 205, but collects a file newly stored in the file server 300 or the like, or only a difference for an updated file. Next, the crawler unit 203 transmits the collected file to the contents extraction unit 204 and receives contents extracted from the file from the contents extraction unit 204. In the present embodiment, the contents extraction unit 204 extracts text from a file and the crawler unit 203 receives extracted text. Next, the crawler unit 203 stores the file storage destination information and the extracted contents in the file information DB 205 in association with each other. In the present embodiment, an aspect is explained in which the contents extraction unit 204 extracts text from a file, but the contents may be images or the like other than text. In this case, the contents extraction unit 204 extracts a feature amount for searching for a similar image from an image included in a file and transmits the feature amount to the crawler unit 203.

The analysis unit 202 receives scanned data generated by scanning a document from the image forming apparatus 100 via the communication unit 201. At this time, the analysis unit 202 collectively analyzes the received plurality of pieces of scanned data in the case where the analysis unit 202 is notified in advance of the start of a continuous scan continuously scanning a plurality of kinds of document from the image forming apparatus 100. At the same time, the analysis unit 202 temporarily saves the received plurality of pieces of scanned data in the RAM 132 or the storage device 133. After this, the analysis unit 202 integrates the plurality of pieces of scanned data temporarily saved in the RAM 132 or the storage device 133 into one piece of scanned data at the timing at which the analysis unit 202 is notified of the end of the continuous scan from the image forming apparatus 100. Next, the analysis unit 202 transmits the scanned data to the contents extraction unit 204 and receives contents extracted from the scanned data from the contents extraction unit 204. In the present embodiment, the contents extraction unit 204 extracts text from scanned data and the analysis unit 202 receives extracted text. Next, the analysis unit 202 searches the file information DB 205 and acquires information on the storage destination in which a file having contents similar to the contents of the scanned data is stored. In the present embodiment, the analysis unit 202 further outputs a scanned data storage destination candidate list in which the scanned data and the acquired storage destination information are associated with each other.

The contents extraction unit 204 extracts contents from the scanned data received from the analysis unit 202 or the file received from the crawler unit 203. In the present embodiment, the contents extraction unit 204 extracts text from scanned data or a file. Further, the contents extraction unit 204 performs morphological analysis processing on extracted text, divides the text into appropriate clause phrase units, and also performs processing to totalize the frequency of appearance of words that appear in the text. In another embodiment, the contents extraction unit 24 extracts an image from scanned data or a file. Further, the contents extraction unit 204 performs processing to extract a feature amount of the image included in the extracted image.

Figure 6:
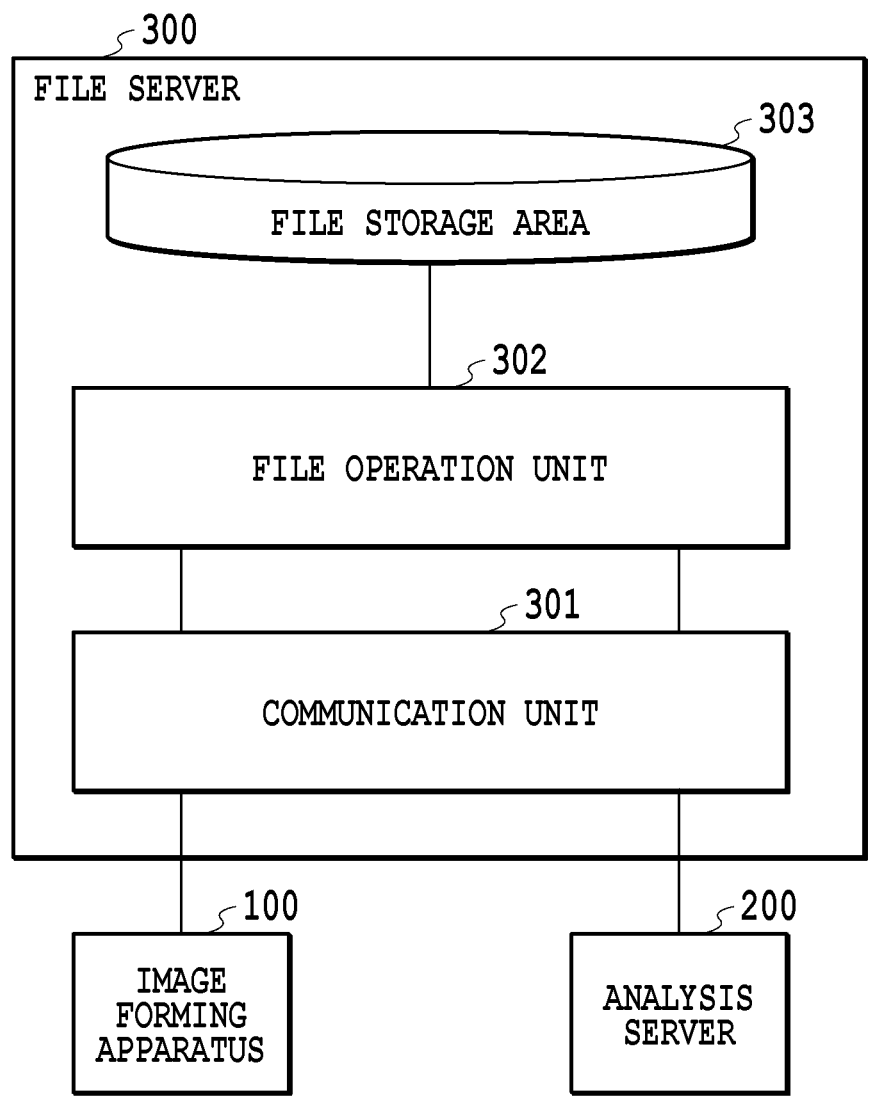
FIG. 6 is a block diagram showing a software function configuration of a file server in the embodiment.

FIG. 6 is a block diagram showing a software function configuration of the file server 300 in the present embodiment. The processing in each function unit shown in FIG. 6 is performed by the CPU 131 executing the program code stored in the storage device 133 after developing the program code onto the RAM 132. The file server 300 has a communication unit 301, a file operation unit 302, and a file storage area 303. The file operation unit 302 receives various requests from the image forming apparatus 100 and the analysis server 200 via the communication unit 301. The file operation unit 302 receives a request to store a file in the file storage area 303, a request to acquire a file from the file storage area 303, etc. The file operation unit 302 performs transmission and reception of a file with the file storage area 303 in accordance with a received request. The file storage area 303 is implemented by, for example, the storage device 133 and has a function to store a file under the control of the file operation unit 302.

Figure 7:
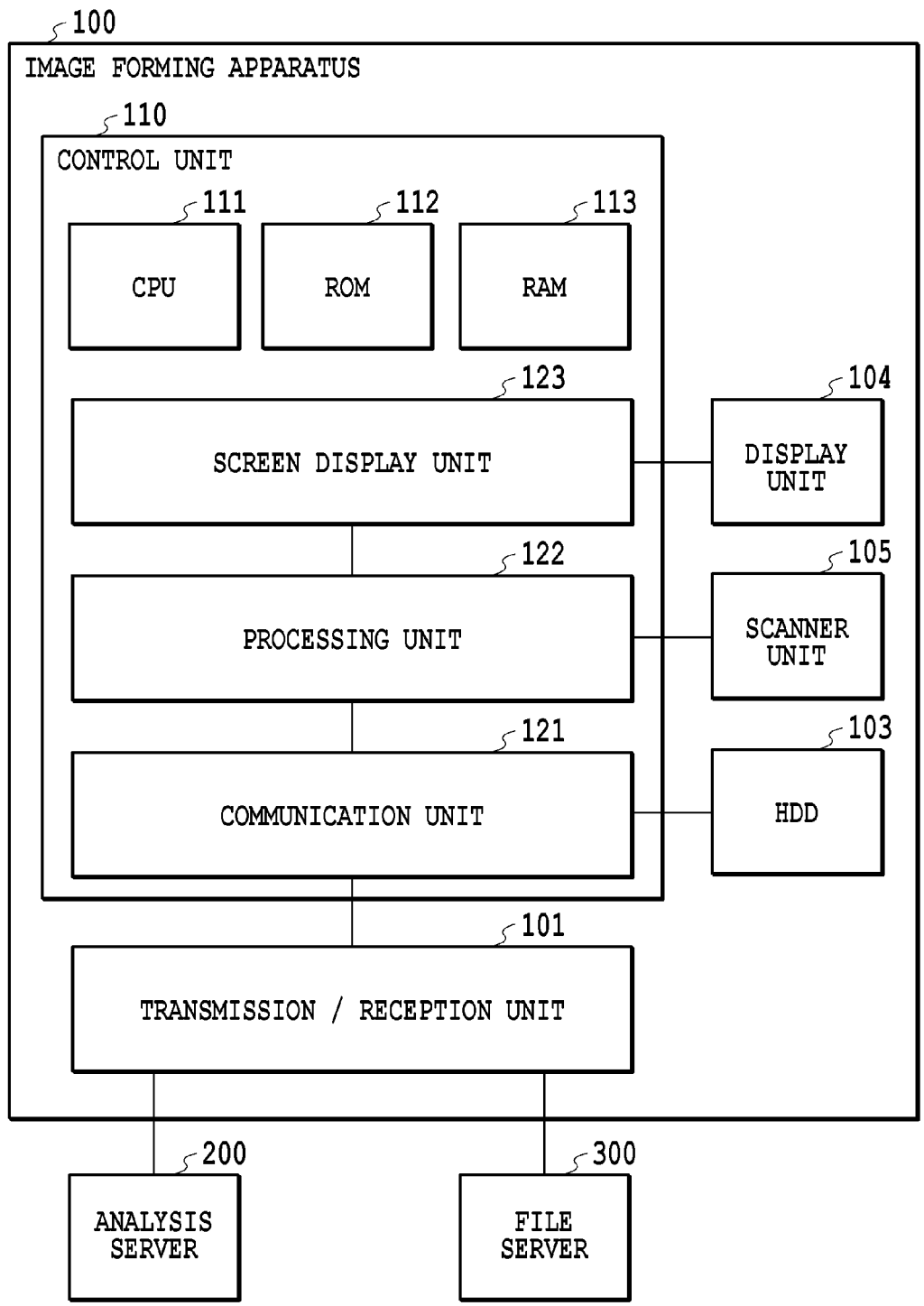
FIG. 7 is a block diagram showing a software function configuration of the image forming apparatus in the embodiment.

FIG. 7 is a block diagram showing a function configuration of document management application software of the image forming apparatus 100. The processing in each function unit shown in FIG. 7 is performed by the CPU 111 of the control unit 110 executing the program code stored in the HDD 103 after developing the program code onto the RAM 113.

A processing unit 122 performs communication with the analysis server 200 and the file server 300 via a communication unit 121. The processing unit 122 gives the scanner unit 105 instructions to scan a document. Upon receipt of scanned data from the scanner unit 105, the processing unit 122 saves the scanned data in the HDD 103. At this time, the processing unit 122 transmits the scanned data received from the scanner unit 105 or the scanned data saved in the HDD 103 to the analysis server 200 and receives analysis results of the transmitted scanned data. Further, the processing unit 122 determines a storage destination of the scanned data from the storage destination candidate list that is output as the results of the analysis and outputs the scanned data received from the scanner unit 105 or the scanned data saved in the HDD 103 to the determined storage destination, such as the file server 300. Details of the series of processing sequence by the processing unit 122 will be described later with reference to FIGS. 8 and 9. A screen display unit 123 causes the display unit 104 to display various screens that are presented to a user of the document management system 1. Specifically, the screen display unit 123 causes the display unit 104 to display an operation screen and makes a processing request to the processing unit 122 in accordance with the various operations received from a user via the operation screen.

Figure 8:
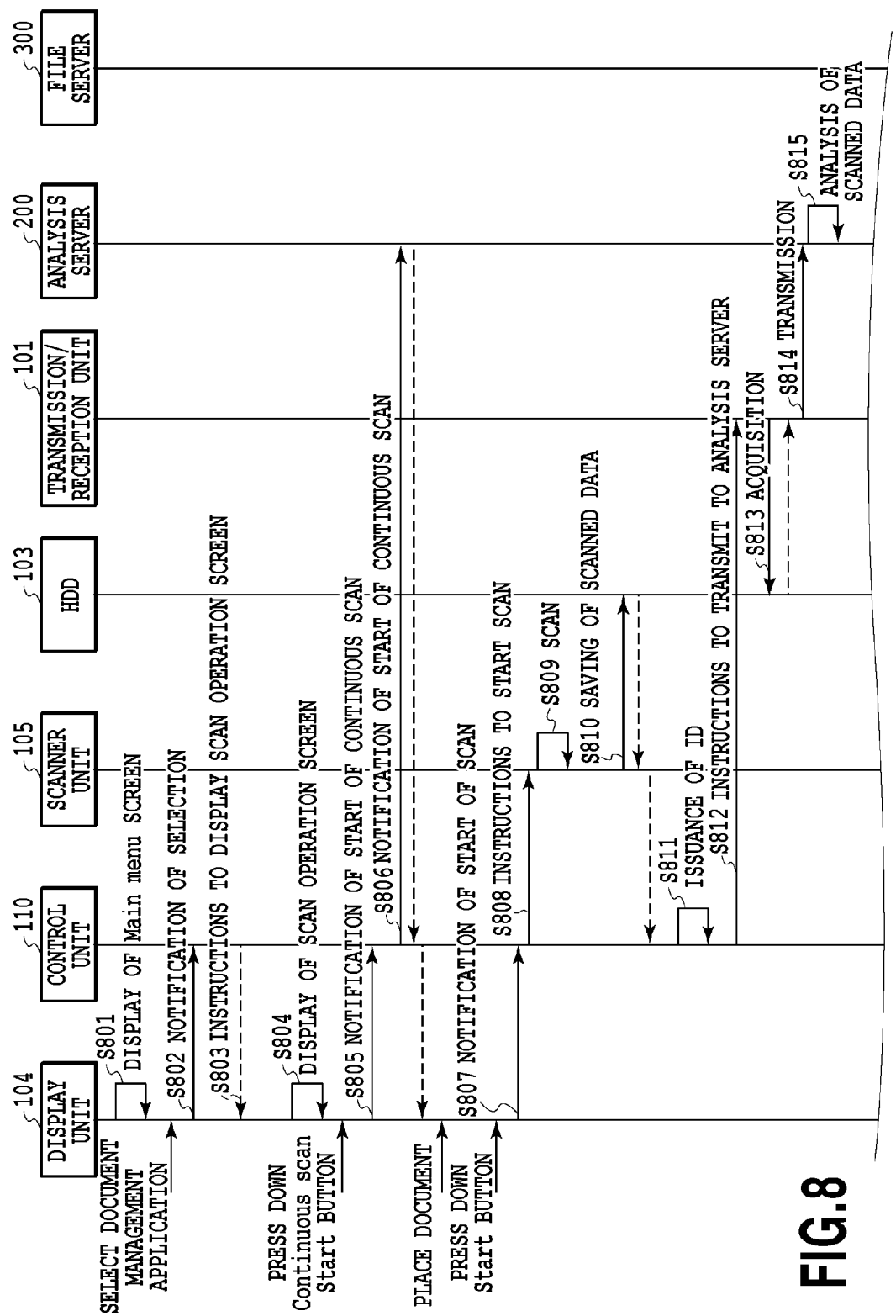
FIG. 8 is a sequence diagram of the document management system in the embodiment.

FIG. 8 is a sequence diagram explaining the processing contents of the document management system 1 that are the important parts of the present embodiment. Hereinafter, with reference to the sequence diagram shown in FIG. 8, the series of processing from displaying a Main menu screen on the display unit 104 of the image forming apparatus 100 (S801) until scanned data is stored in the file server 300 (S927) is explained.

Figure 10:
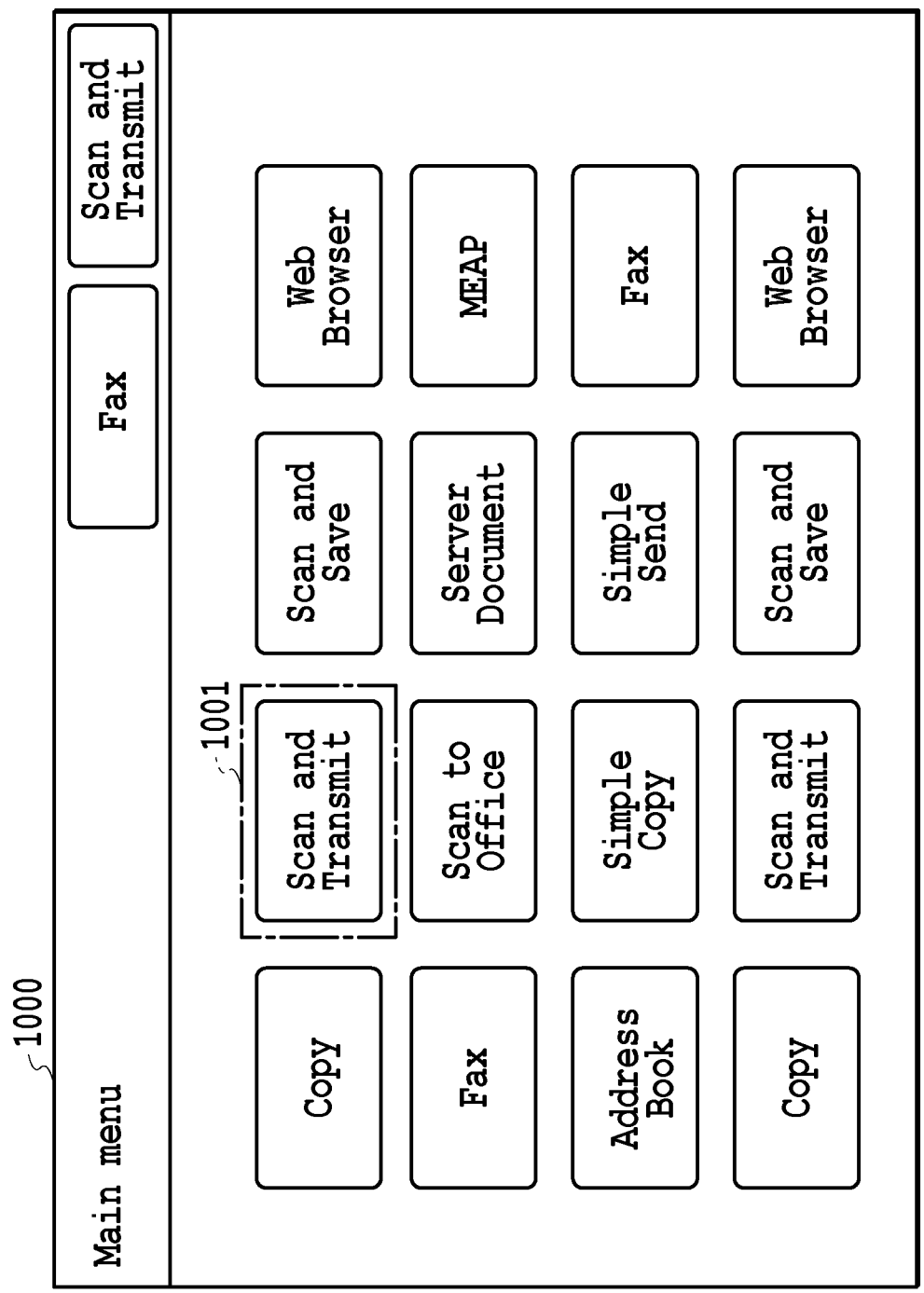
FIG. 10 is a diagram showing a display example of a Main menu screen in the embodiment.

At S801, the display unit 104 of the image forming apparatus 100 displays a Main menu screen. Here, an example of a Main menu screen in the present embodiment is shown in FIG. 10. FIG. 10 is a diagram showing an example in which a Main menu screen 1000 is displayed on the display unit 104 of the image forming apparatus 100. The Main menu screen 1000 includes a plurality of icons indicating applications that can be used on the image forming apparatus 100. The Main menu screen 1000 is displayed in the case where an input to a main menu key (not shown) of the image forming apparatus 100 is received. In the case where the operation to select an icon 1001 specifying "Scan and transmit" is received in the state where the Main menu screen 1000 is displayed on the display unit 104, the document management application software of the image forming apparatus 100 is activated.

Explanation is returned to FIG. 8 again. In the case where the operation to select the icon 1001 is received, at S802, the display unit 104 notifies the control unit 110 that the document management application has been selected. At S803, the control unit 110 transmits screen display data to the display unit 104 and gives instructions to display a scan operation screen. At S804, the display unit 104 displays a scan operation screen.

Figure 11:
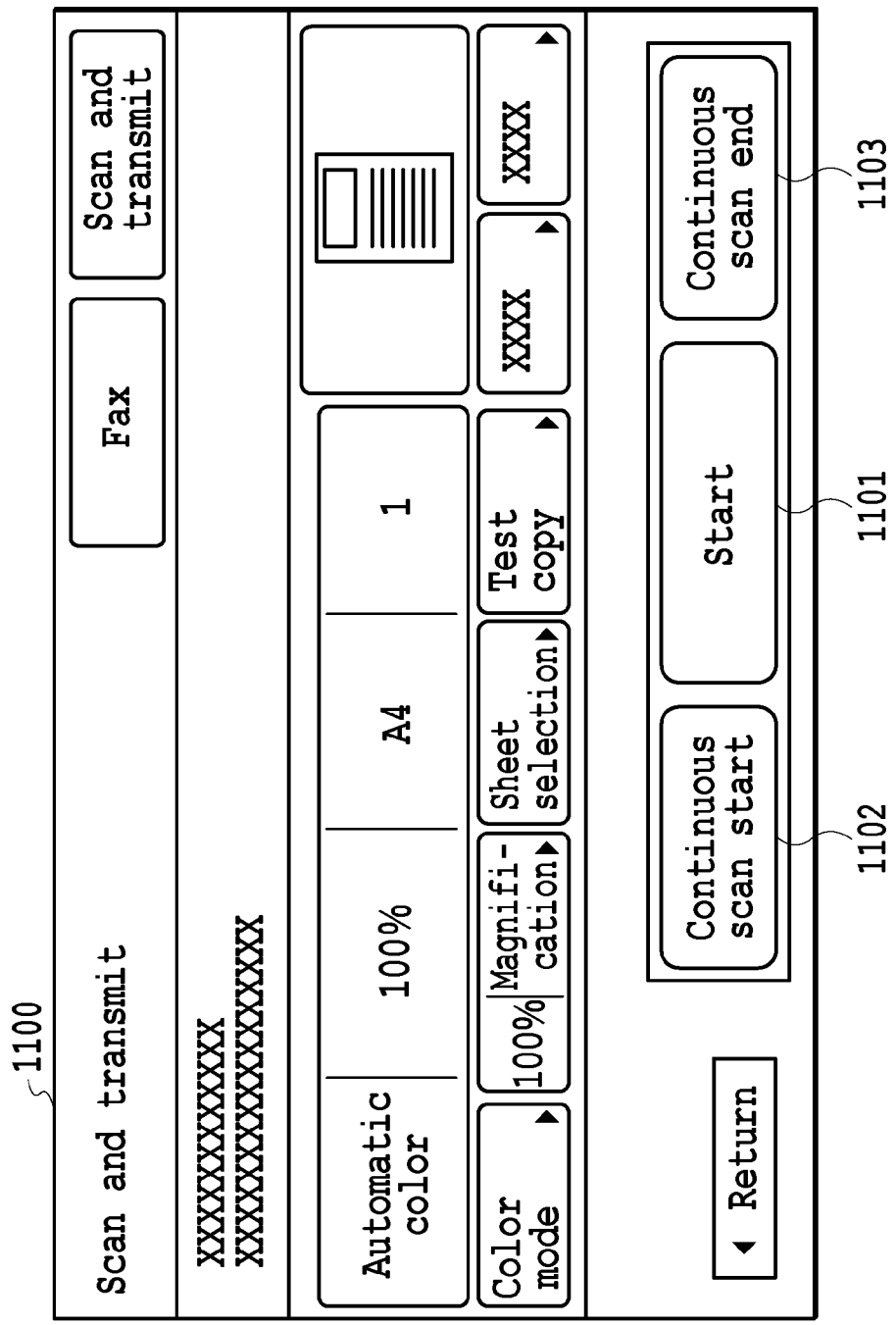
FIG. 11 is a diagram showing a display example of a scan operation screen in the embodiment.

Here, an example of a scan operation screen in the present embodiment is shown in FIG. 11. FIG. 11 is a diagram showing an example in which a scan operation screen 1100 is displayed on the display unit 104 of the image forming apparatus 100. In the case where a document is placed on the ADF (Auto Document Feeder) of the scanner unit 105 and an input to a Start button 1101 is received in the state where the scan operation screen 1100 is displayed on the display unit 104, a scan is performed by the scanner unit 105. As described previously, the transmission/reception unit 101 of the image forming apparatus 100 transmits scanned data to the analysis server 200. Further, in the case where the scanner unit 105 continuously scans a plurality of kinds of document placed on the ADF, it is possible to continuously scan the plurality of kinds of document by using a Continuous scan start button 1102 and a Continuous scan end button 1103. Specifically, a user repeats the operation to place documents on the ADF of the scanner unit 105 and then to press down the Start button 1101 after pressing down the Continuous scan start button 1102, and after the scan of a plurality of kinds of document ends, the user presses down the Continuous scan end button 1103. It can be said that the Continuous scan start button 1102 and the Continuous scan end button 1103 such as described above function as an instruction reception unit configured to receive instructions to start and end a continuous scan. At this time, it may also be possible to apply a method of generating a plurality of pieces of scanned data in a single scan by continuously scanning a plurality of kinds of document by the scanner unit 105 detecting a separator that is interposed between the plurality of kinds of document.

Explanation is returned to FIG. 8 again. In the case where the pressing-down of the Continuous scan start button 1102 of the control unit 110 is received, at S805, the display unit 104 notifies the control unit 110 that instructions to start a continuous scan have been received. Further, at step S806, the communication unit 121 of the control unit 110 notifies the analysis server 200 that a continuous scan has started.

Next, in the case where the pressing-down of the Start button 1101 is received in the state where a document is placed on the ADF of the scanner unit 105, at S807, the display unit 104 notifies the control unit 110 that the pressing-down of the Start button 1101 has been received. At S808, the control unit 110 gives the scanner unit 105 instructions to start a scan. At S809, the scanner unit 105 scans a document and generates scanned data. At S810, the scanner unit 105 saves the scanned data in the HDD 103. At S811, the control unit 110 issues an ID that is associated with the scanned data saved in the HDD 103.

Here, an example of the scanned data management method in the present embodiment is shown in FIGS. 12A and 12B. In the present embodiment, the control unit 110 manages scanned data or the like by issuing an ID (identifier). FIG. 12A is a diagram showing an example of a group ID table 1210 in which a group ID is associated with a document ID. The group ID table 1210 is managed by the control unit 110 and saved in the HDD 103. The control unit 110 issues a single document ID to the scanned data generated from a single document. The control unit 110 further associates a group ID with each document ID and saves them in the group ID table 1210. The group ID in the present embodiment is an ID that is given for specifying a plurality of pieces of scanned data generated from a plurality of documents relating to one another by a continuous scan. For example, the same group ID is given to the scanned data generated by being scanned during one session from the start of a continuous scan (S805) until the continuous scan ends (S919) in the sequence diagram in FIG. 8.

Explanation is returned to FIG. 8 again. At S812, the control unit 110 gives the transmission/reception unit 101 instructions to transmit the scanned data saved in the HDD 103 at S810 to the analysis server 200. At S813, the transmission/reception unit 101 acquires the scanned data from the HDD 103 and transmits the scanned data acquired at S813 to the analysis server 200. At S815, the analysis server 200 analyzes the received scanned data and generates a storage destination candidate list corresponding to the analyzed single scanned data. The scanned data analyzed at S815 is also used in the analysis at S920, and therefore, the scanned data is temporarily saved in the RAM 132 or the storage device 133 of the analysis server 200. In the case where the analysis is completed at S815, the analysis server 200 transmits a storage destination candidate list that is output as the results of the analysis to the image forming apparatus 100. The transmission/reception unit 101 having received a response from the analysis server 200 further transmits the analysis results to the control unit 110.

Figure 9:
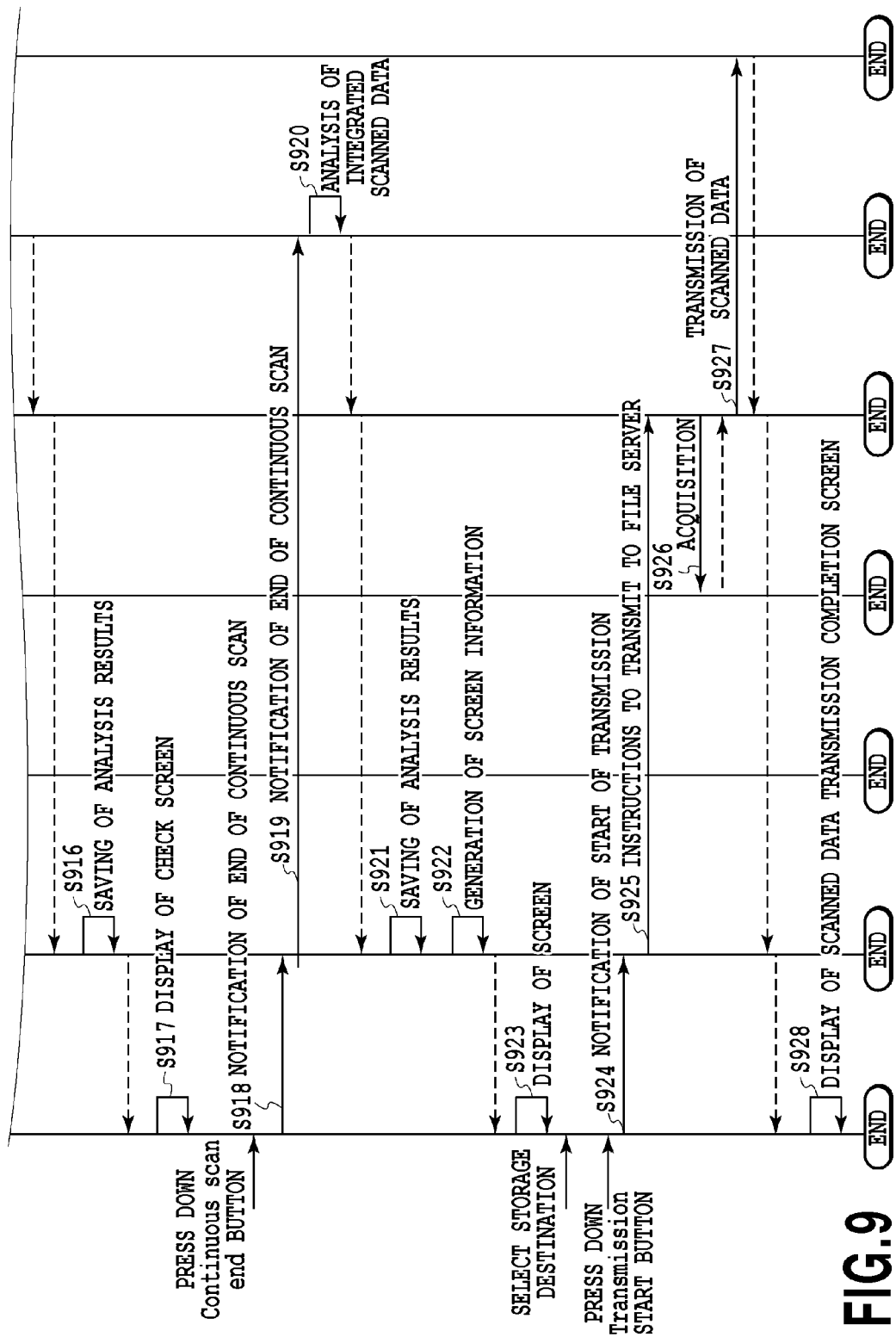
FIG. 9 is a sequence diagram of the document management system in the embodiment.

Subsequently, with reference to FIG. 9, explanation of the sequence diagram of the document management system 1 in the present embodiment is continued. At S916, the control unit 110 saves the received analysis results in the RAM 113 or the HDD 103.

Here, an example of the management method of analysis results in the present embodiment is shown in FIGS. 12A to 12C. In the present embodiment, the control unit 110 manages a document ID and a storage destination candidate in association with each other. FIG. 12B is a diagram showing an example of a storage destination candidate table 1220 in which a storage destination candidate is associated with a document ID. The storage destination candidate table 1220 is managed by the control unit 110 and saved in the HDD 103. The control unit 110 associates one or a plurality of kinds of storage destination candidate with a single document ID and saves them in the storage destination candidate table 1220. The storage destination candidate in the present embodiment is generated by the analysis server 200 from the information on the storage destination in which a file having contents similar to the contents of the scanned data is stored.

At S917, the display unit 104 displays a check screen (not shown) for checking whether or not a user scans documents continuously. In the case where a user scans documents continuously, the control unit 110 repeats the processing at S807 to S917 again and manages a plurality of storage destination candidates for each document ID corresponding to each of the plurality of pieces of scanned data.

In the case where the pressing-down of the Continuous scan end button 1103 on the scan operation screen 1100 is received, at S918, the display unit 104 notifies the control unit 110 that the instructions to end the continuous scan have been received. Further, at S919, the communication unit 121 of the control unit 110 notifies the analysis server 200 that the continuous scan has ended.

At S920, the analysis server 200 collectively analyzes all the scanned data temporarily saved at S815. In the present embodiment, the analysis unit 202 of the analysis server 200 integrates the plurality of pieces of scanned data temporarily saved in the RAM 132 or the storage device 133 into one piece of scanned data and analyzes the integrated scanned data. As the results of the analysis processing, the analysis server 200 generates a storage destination candidate list of the integrated scanned data. In the case where the analysis is completed at S920, the analysis server 200 transmits the analysis results to the image forming apparatus 100. The transmission/reception unit 101 having received a response from the analysis server 200 further transmits the analysis results to the control unit 110. At S921, the control unit 110 saves the received analysis results in the RAM 113 or the HDD 103.

Here, an example of the management method of analysis results in the present embodiment is shown in FIGS. 12A to 12C. As described previously, in the present embodiment, the control unit 110 manages a document ID and a storage destination candidate in association with each other. FIG. 12C is a diagram showing an example of a storage destination candidate table 1230 in which a storage destination candidate is associated with a document ID. In the processing at S921, the control unit 110 adds a storage destination candidate list 1231 included in the analysis results at S920 to the storage destination candidate table 1220 in FIG. 12B and acquires the storage destination candidate table 1230 in FIG. 12C. In the storage destination candidate list 1231, data in which a document ID of "ALL" indicating all documents scanned during one session during which the continuous scan is performed and one or a plurality of kinds of storage destination candidate corresponding to the document ID "ALL" are associated with each other is included. As shown in FIG. 12C, the storage destination candidate table 1230 to which the storage destination candidate list 1231 that is output as the results of the analysis is added is managed by the control unit 110 and saved in the HDD 103. Further, at the timing at S921, the same group ID is given to the scanned data generated by being scanned during one session from the start of the continuous scan until the continuous scan ends, and the scanned data is added to the group ID table 1210.

Explanation is returned to FIG. 9 again. At S922, the control unit 110 refers to the storage destination candidate table 1230 and generates screen information for receiving a selection of a storage destination of scanned data. At S923, the display unit 104 displays various selection screens.

Figure 13:
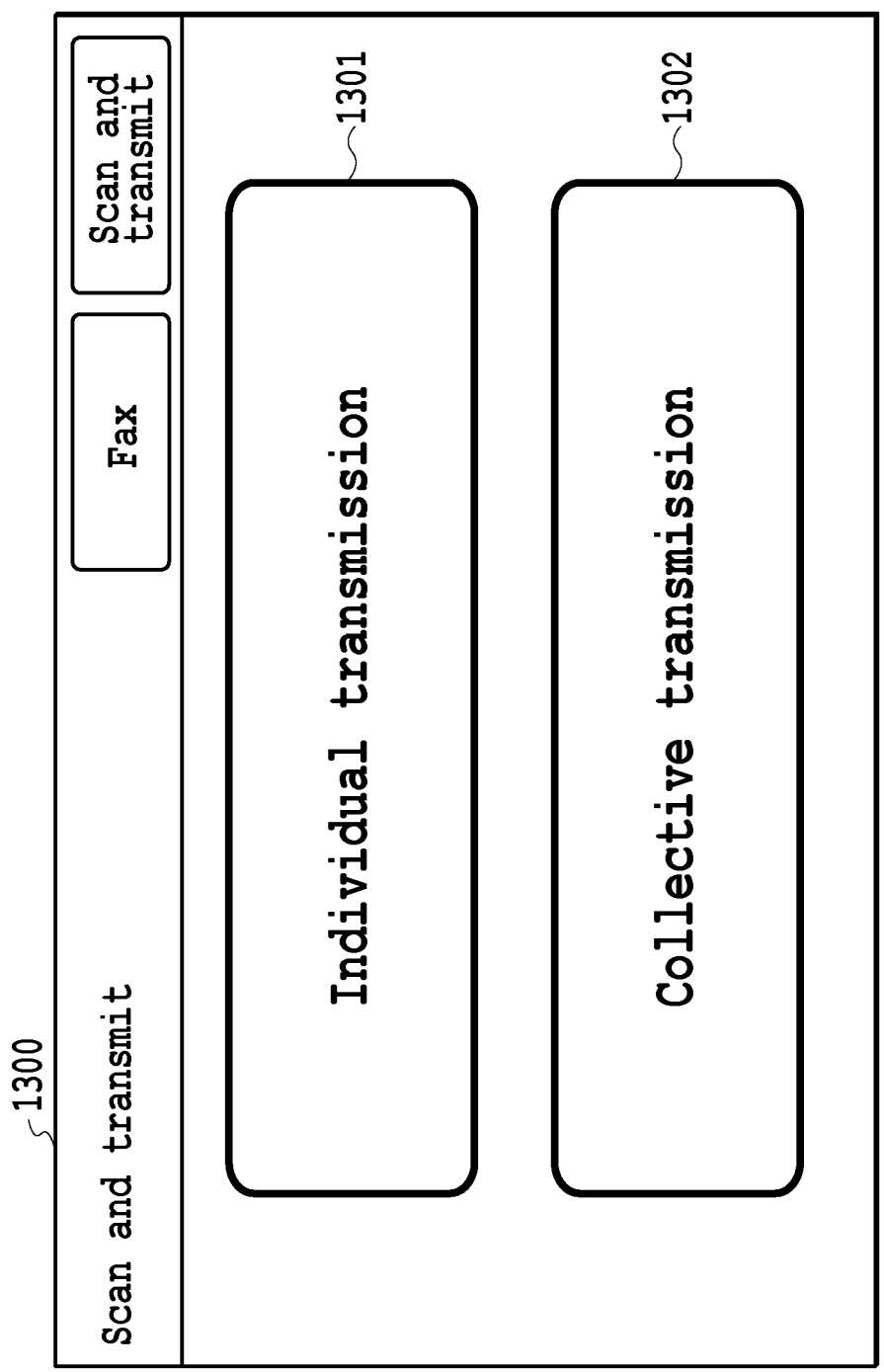
FIG. 13 is a diagram showing a display example of a transmission mode selection screen in the embodiment.
Figure 14A:
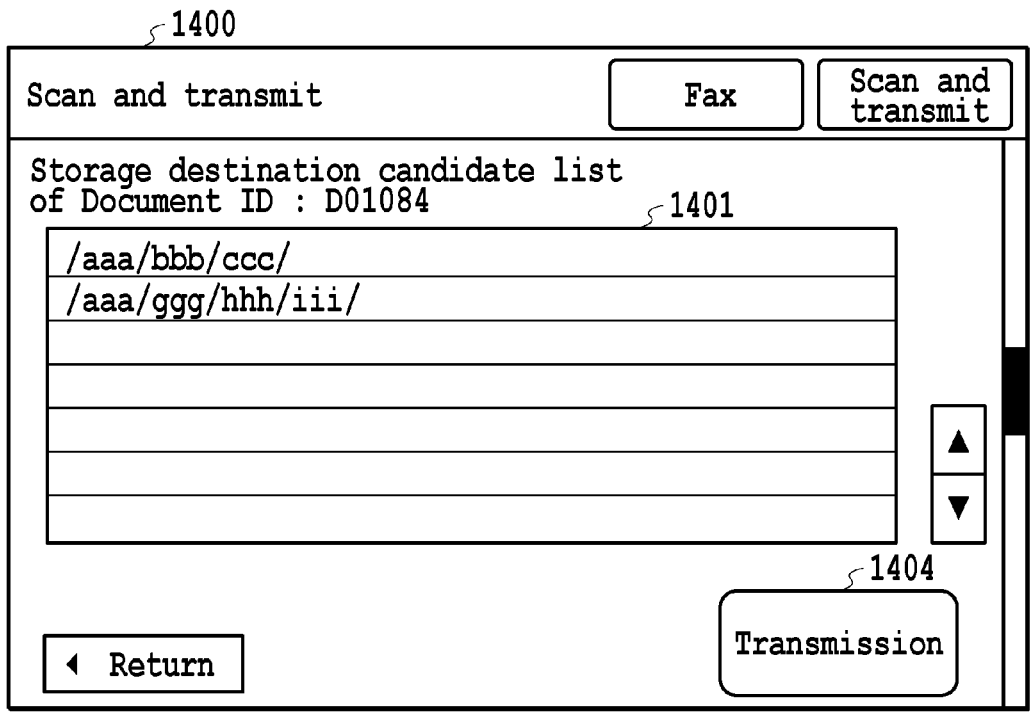
FIG. 14A is a diagram showing an example of a storage destination selection screen that is called in the case where individual transmission of scanned data is selected.
Figure 14B:
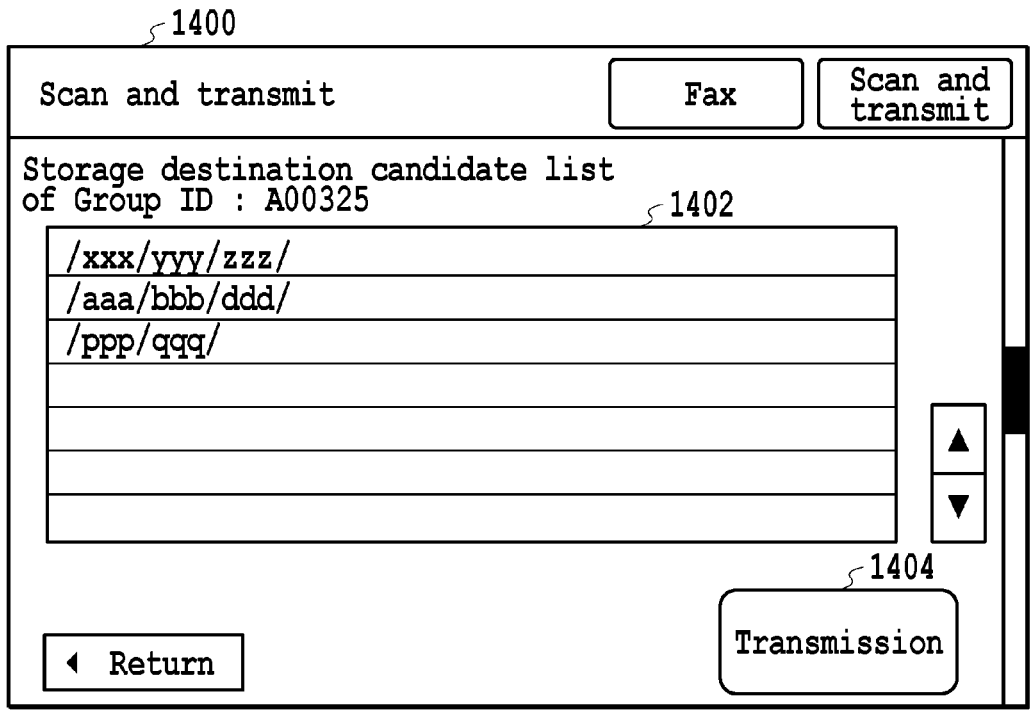
FIG. 14B is a diagram showing an example of the storage destination selection screen that is called in the case where collective transmission of scanned data is selected.

Here, an example of a transmission mode selection screen in the present embodiment is shown in FIG. 13 and an example of a storage destination selection screen is shown in FIGS. 14A and 14B. FIG. 13 is a diagram showing an example in which a transmission mode selection screen 1300 is displayed on the display unit 104 of the image forming apparatus 100. The transmission mode selection screen 1300 in the present embodiment includes an Individual transmission instruction button 1301 and a Collective transmission instruction button 1302. FIGS. 14A and 14B are diagrams each showing an example in which a storage destination selection screen 1400 is displayed on the display unit 104 of the image forming apparatus 100. The storage destination selection screen 1400 in the present embodiment includes Storage destination candidate lists 1401 and 1402, and a Transmission start button 1404.

In the case where an input to the Individual transmission instruction button 1301 is received, the storage destination selection screen 1400 in FIG. 14A is displayed and a selection of a storage destination of the first scanned data in the session from among storage destinations enumerated in the Storage destination candidate list 1401 is received from a user. On the storage destination selection screen 1400 in the present embodiment, the Storage destination candidate list 1401 is configured as a GUI (Graphical User Interface) that receives a selection from a user. It can be said that the Storage destination candidate lists 1401 and 1402 as described above function as a selection reception unit configured to receive a selection of a storage destination.

Next, in the case where an input to the Transmission start button 1404 is received, the control unit 110 gives the transmission/reception unit 101 instructions to transmit the first scanned data in the session to the storage destination the selection of which is received at S924. In more detail, in the case where the storage destination is specified by a file path and the file path specifies the file storage area 303, the control unit 110 gives the transmission/reception unit 101 instructions to transmit the scanned data to the file server 300. In the present embodiment, as an example, the case where the file path specifies the file storage area 303 is explained, but the file path may specify a file storage area other than the file server 300. In the case where each piece of scanned data is transmitted individually, the series of processing from the reception of the input to the Individual transmission instruction button 1301 until the instructions to transmit the scanned data is performed repeatedly the number of times corresponding to the number of pieces of the scanned data.

In the case where an input to the Collective transmission instruction button 1302 is received, the storage destination selection screen 1400 in FIG. 14B is displayed and a selection of a storage destination of the scanned data integrated at S920 from among storage destinations enumerated in the Storage destination candidate list 1402 is received from a user. Next, in the case where an input to the Transmission start button 1404 is received, the control unit 110 gives the transmission/reception unit 101 instructions to transmit all the scanned data in the session to the file server 300. It can be said that the Individual transmission instruction button 1301 and the Collective transmission instruction button 1302 as described above function as a mode selection reception unit configured to receive a selection of a mode of transmitting scanned data.

Returning to FIG. 9 again. In the case where the pressing-down of the Transmission start button 1404 is received, at S924, the display unit 104 notifies the control unit 110 that the pressing-down of the Transmission start button 1404 has been received. At S925, the control unit 110 gives the transmission/reception unit 101 instructions to transmit the scanned data saved in the HDD 103 at S810 to the file server 300, which is the storage destination. At S926, the transmission/reception unit 101 acquires the scanned data from the HDD 103. At this time, the transmission/reception unit 101 acquires one piece of the scan data to be transmitted in the case where the individual transmission instructions are selected, and acquires all the scanned data in the session in the case where the collective transmission instructions are selected. At S927, the transmission/reception unit 101 transmits the acquired scanned data to the file server 300, which is the storage destination. Upon receipt of the scanned data from the transmission/reception unit 101, the file server 300 stores the received scanned data in the storage destination the selection of which is received at S923. In the case where the storing of the scanned data ends, the file server 300 transmits the processing results to the image forming apparatus 100. The transmission/reception unit 101 having received a response from the file server 300 further transmits the processing results to the control unit 110. Next, the control unit 110 generates screen information for displaying the completion of the transmission of the scanned data. At S928, the display unit 104 displays a scanned data transmission completion screen (not shown). On the other hand, in the case where each piece of the scanned data is transmitted individually, the series of processing from the reception of the input to the Individual transmission instruction button 301 (S924) to the scanned data transmission (S927) is repeated the number of times corresponding to the number of pieces of the scanned data.

As explained above, the document management system in the present embodiment continuously scans a plurality of documents relating to one another and collectively analyzes a plurality of pieces of scanned data generated during the continuous scan. It is possible for the image forming apparatus of the present embodiment to receive one or more storage destination candidates of the plurality of pieces of scanned data as the above-described analysis results and to output the plurality of pieces of scanned data to an appropriate storage destination among the one or more storage destination candidates. Because of this, it is possible to collectively classify the scanned data generated by scanning a plurality of documents relating to one another into an optimum storage destination.

(Other Embodiments)

The document management system in the present embodiment has the configuration in which the image forming apparatus 100, the analysis server 200, and the file server 300 are connected to one another via the network NW. Because of this, the configuration is such that the image forming apparatus 100 and the analysis server 200 perform the processing to scan documents and the processing to analyze scanned data separately. In other embodiments, the configuration is not limited to this and an aspect may be accepted in which the image forming apparatus 100 further performs the processing to analyze scanned data (S815, S920). At this time, it may also be possible for the image forming apparatus 100 to send scanned data to the file server 300, which is the storage destination, or to output scanned data to the HDD 103 of the image forming apparatus 100 based on the results of the analysis processing performed by the image forming apparatus 100 itself.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to collectively classify scanned data generated by scanning a plurality of documents relating to one another into an optimum storage destination.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-094348, filed May 1, 2015, which is hereby incorporated by reference herein in its entirety.

What is claimed is:

1. A document management system in which an image forming apparatus that transmits scanned data generated by scanning a document to an analysis server and which outputs the scanned data to a storage destination determined from among one or more storage destination candidates corresponding to the scanned data received from the analysis server, and the analysis server that analyzes the scanned data received from the image forming apparatus and which transmits the one or more storage destination candidates that are output as the results of the analysis to the image forming apparatus, are connected via a network, wherein the image forming apparatus comprises:
  a first memory for storing a first computer program; and
  a first processor for executing the first computer program to perform a first process comprising:
    notifying the analysis server of the start and end of a continuous scan scanning a plurality of documents relating to one another;
    receiving first storage destination candidates corresponding to a plurality of pieces of scanned data in response to transmission of the plurality of pieces of scanned data generated between the start of the continuous scan and the end of the continuous scan to the analysis server;
    determining the storage destination of the plurality of pieces of scanned data from among the first storage destination candidates; and
    outputting the plurality of pieces of scanned data to the determined storage destination, and
  wherein the analysis server comprises:

a second memory for storing a second computer program;

a second processor for executing the second computer program to perform a second process comprising:

collectively analyzing the plurality of pieces of scanned data received between the start of the continuous scan and the end of the continuous scan in response to notification of the end of the continuous scan from the image forming apparatus; and transmitting the first storage destination candidates that are output as the results of the analysis to the image forming apparatus.

2. The document management system according to claim 1, wherein the analysis server further comprises:

a storage unit configured to store the plurality of pieces of scanned data received from the image forming apparatus, wherein the second process further comprises integrating the plurality of pieces of scanned data stored in the storage unit in response to notification of the end of the continuous scan from the image forming apparatus, and wherein the integrated scanned data is analyzed in the collectively analyzing step.

3. The document management system according to claim 2, wherein the collectively analyzing step further includes extracting contents from the integrated scanned data; and acquiring storage destination information specifying a location where a file having contents similar to the contents of the integrated scanned data is stored, and wherein the first storage destination candidates that are output as the results of the analysis are the acquired storage destination information.

4. The document management system according to claim 3, wherein the second process further comprises:

collecting the file and the storage destination information specifying the location where the file is stored;

extracting contents from the collected file; and storing the extracted contents and the storage destination information of the collected file in association with each other.

5. The document management system according to claim 1, wherein the first process further comprises:

receiving instructions to start the continuous scan and to end the continuous scan; and notifying the analysis server of the start of the continuous scan and the end of the continuous scan in response to reception of the instructions.

6. The document management system according to claim 1, wherein the first process further comprises:

displaying a storage destination selection screen including the first storage destination candidates; and receiving a selection of the storage destination via a GUI on the storage destination selection screen, and wherein the storage destination is determined in accordance with the selection in the determining step.

7. The document management system according to claim 1, wherein the first process further comprises:

receiving second storage destination candidates corresponding to a single piece of scanned data from the analysis server in response to transmission of the single piece of scanned data generated between the start of the continuous scan and the end of the continuous scan to the analysis server;

determining the storage destination of the single piece of scanned data from among the second storage destination candidates corresponding to the single piece of scanned data; and outputting the single piece of scanned data to the determined storage destination, and wherein the second process further comprises:

individually analyzing the received single piece of scanned data in response to reception of the single piece of scanned data from the image forming apparatus between the start of the continuous scan and the end of the continuous scan; and transmitting the second storage destination candidates corresponding to the single piece of scanned data that are output as the results of the analysis to the image forming apparatus.

8. The document management system according to claim 7, wherein the first process further comprises receiving a selection of one of a mode of outputting the plurality of pieces of scanned data and a mode of outputting the single piece of scanned data, and wherein the determining step determines:

the storage destination of the plurality of pieces of scanned data from among the first storage destination candidates corresponding to the plurality of pieces of scanned data, in a case where the mode of outputting the plurality of pieces of scanned data is selected; and the storage destination of the single piece of scanned data from among the second storage destination candidates corresponding to the single piece of scanned data, in a case where the mode of outputting the single piece of scanned data is selected.

9. An image forming apparatus that is connected with an analysis server via a network, which transmits scanned data generated by scanning a document to the analysis server, and which outputs the scanned data to a storage destination determined from among one or more storage destination candidates corresponding to the scanned data received from the analysis server, the image forming apparatus comprising:

a memory for storing a computer program; and a processor for executing the computer program to perform a process comprising:

notifying the analysis server of the start and end of a continuous scan scanning a plurality of documents relating to one another;

receiving first storage destination candidates corresponding to a plurality of pieces of scanned data in response to transmission of the plurality of pieces of scanned data generated between the start of the continuous scan and the end of the continuous scan to the analysis server;

determining the storage destination of the plurality of pieces of scanned data from among the first storage destination candidates; and outputting the plurality of pieces of scanned data to the determined storage destination.

10. An analysis server that is connected with an image forming apparatus via a network, which analyzes scanned data received from the image forming apparatus, and which transmits one or more storage destination candidates that are output as the results of the analysis to the image forming apparatus, the analysis server comprising:

a memory for storing a computer program; and
a processor for executing the computer program to perform a process comprising:
collectively analyzing a plurality of pieces of scanned data received from the image forming apparatus between the start of a continuous scan scanning a plurality of documents relating to one another and the end of the continuous scan in response to notification of the end of the continuous scan from the image forming apparatus; and
transmitting a first storage destination candidates corresponding to the plurality of pieces of scanned data that are output as the results of the analysis to the image forming apparatus.

11. A document management method of a system in which an image forming apparatus that transmits scanned data generated by scanning a document to an analysis server and which outputs the scanned data to a storage destination determined from among one or more storage destination candidates corresponding to the scanned data received from the analysis server, and the analysis server that analyzes the scanned data received from the image forming apparatus and which transmits the one or more storage destination candidates that are output as the results of the analysis to the image forming apparatus, are connected via a network, the method comprising:
a notification step, that is executed by the image forming apparatus, of notifying the analysis server of the start and end of a continuous scan scanning a plurality of documents relating to one another;
a first analysis step, that is executed by the analysis server, of collectively analyzing the plurality of pieces of scanned data received between the start of the continuous scan and the end of the continuous scan in response to notification of the end of the continuous scan;
a transmission step, that is executed by the analysis server, of transmitting first storage destination candidates that are output as the results of the analysis to the image forming apparatus;
a reception step, that is executed by the image forming apparatus, of receiving the first storage destination candidates corresponding to a plurality of pieces of scanned data from the analysis server;
a determination step, that is executed by the image forming apparatus, of determining the storage destination of the plurality of pieces of scanned data from among the first storage destination candidates; and
an output step, that is executed by the image forming apparatus, of outputting the plurality of pieces of scanned data to the determined storage destination.

12. A non-transitory computer readable storage medium storing a program for causing a computer to function as an image forming apparatus that is connected with an analysis server via a network, which transmits scanned data generated by scanning a document to the analysis server, and which outputs the scanned data to a storage destination determined from among one or more storage destination candidates corresponding to the scanned data received from the analysis server, wherein
the program causes the computer to:
notify the analysis server of the start and end of a continuous scan scanning a plurality of documents relating to one another;
receive first storage destination candidates corresponding to a plurality of pieces of scanned data in response to transmission of the plurality of pieces of scanned data generated between the start of the continuous scan and the end of the continuous scan to the analysis server;
determine the storage destination of the plurality of pieces of scanned data from among the first storage destination candidates; and
output the plurality of pieces of scanned data to the determined storage destination.

13. A non-transitory computer readable storage medium storing a program for causing a computer to function as an analysis server that is connected with an image forming apparatus via a network, which analyzes scanned data received from the image forming apparatus, and which transmits one ore more storage destination candidates that are output as the results of the analysis to the image forming apparatus, wherein
the program causes the computer to:
collectively analyze a plurality of pieces of scanned data received from the image forming apparatus between the start of a continuous scan scanning a plurality of documents relating to one another and the end of the continuous scan in response to notification of the end of the continuous scan from the image forming apparatus; and
transmit first storage destination candidates corresponding to the plurality of pieces of scanned data that are output as the results of the analysis to the image forming apparatus.

\* \* \* \* \*